Aug. 17, 1926.
N. ABRAMSON
PNEUMATIC CUSHIONED WHEEL
Original Filed March 14, 1924
1,596,787
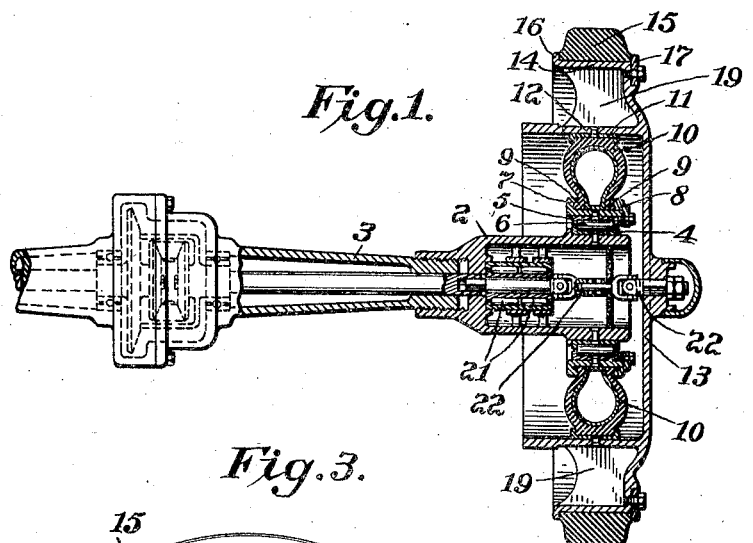
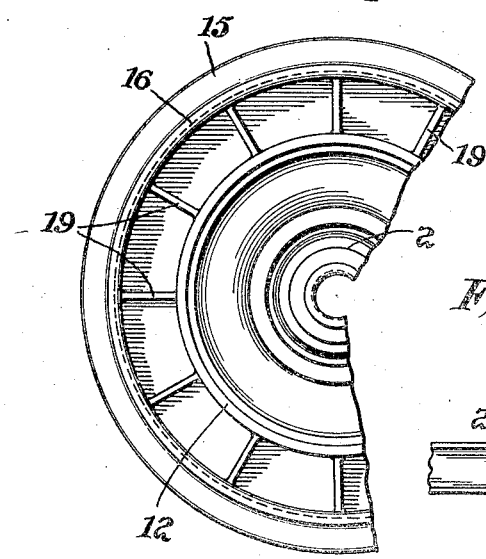
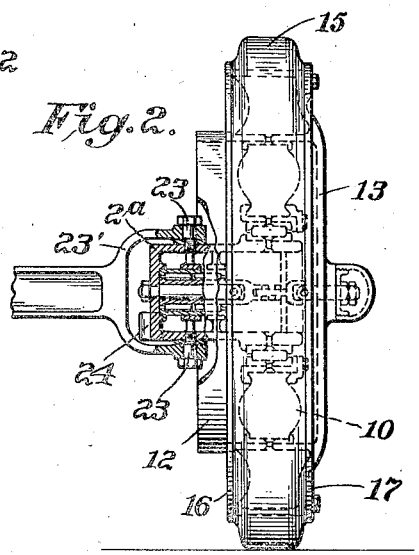
Inventor:
Nathan Abramson,
by Spear, Middleton, Donaldson, Hall
Attys.

Patented Aug. 17, 1926.

1,596,787

UNITED STATES PATENT OFFICE.

NATHAN ABRAMSON, OF LAFAYETTE, LOUISIANA.

PNEUMATIC CUSHIONED WHEEL.

Application filed March 14, 1924, Serial No. 699,301. Renewed May 28, 1926.

The invention comprises a pneumatic cushioned wheel for automobiles in which a solid rubber tire is mounted on the frame or body of the wheel and has traction contact with the roadway, a pneumatic cushion being interposed between the main body or frame of the wheel and a housing forming a part of the car frame, all as described hereinafter in detail.

The invention is shown in the accompanying drawings in which—

Figure 1 is a vertical sectional view of an organization embodying my invention as applied to the back or driving wheel.

Fig. 2 is a similar view as applied to the front wheel.

Fig. 3 is a rear elevation, with parts removed, of the device as applied to the back or driving wheel.

In these drawings and referring first to Fig. 1, the numeral 2 indicates a cylindrical housing forming an enlarged extension of the rear axle housing 3.

This housing has an anti-friction roller track or race-way member 4, encircling it near its outer end and the complementary race-way member 5 encircles the race-way member first mentioned, and between these members are located anti-friction rollers 6.

The race-way member 5 is attached to a channel band or inner rim or ring 7 having flanges 8 to receive beads 9 of the pneumatic cushion 10, which is in the form of a continuous ring like a tire. This ring shaped cushion at its outer edge or periphery fits in a channel of a metal rim or ring 11 which is attached to the inner side of a circular flange 12 formed on the main frame or plate 13 of the wheel; the flange 12 may be utilized as a brake drum. This main wheel member or plate has an annular seat about its outer portion at 14 for a solid tire 15. This may be seated between a permanent flange 16 and a removable ring 17. The seat flange 14 may be braced from the main body of the wheel by brackets 19. Any ordinary forms of clamping rings may be employed to hold the pneumatic cushion in place.

The driving rear axle passes through the ordinary housing and through suitably disposed roller bearings in the enlarged housing indicated at 21. This drive shaft has a section 22 at its outer end for connection with the main member or plate of the wheel, and this section would have suitable universal joint and compensating connection to accommodate the movement of the wheel from its coaxial relation to the housing due to the give of the cushion so that while the wheel can assume positions eccentric to the housing due to the resilient cushion 10, the driving connection with the shaft is maintained.

In the case of the organization for the front wheel, the housing $2^a$ takes the place of the ordinary stub axle for which purpose it is pivoted at 23 in a fork 23' of the front cross bar or shaft. This housing is equipped with a projection or arm 24 for connection with the steering mechanism.

The shaft section 22 may have a universal joint coupling at its outer end with the main plate or frame of the wheel and a second joint of this character where the shaft section 22 connects with the main part of the drive shaft. This shaft section 22 is made in two parts slidably connected with each other, to compensate for the movement of the wheel and car frame relative to each other.

The main part of the wheel may be cast, in which the brackets are in the form of ribs, see Fig. 3.

One of the flanges 8 for holding the pneumatic cushion in place may be removable as shown in Fig. 1.

It will be seen that with my construction the driving power is delivered through the shaft to the wheel frame or plate and to the outer tread portion where the solid tire is located and where the traction occurs. The pneumatic cushion is obviously not subjected to the same wear or liability to puncture as is the case with a pneumatic tire because it has no traction contact with the roadbed.

The pneumatic cushion provides the necessary resiliency within the wheel, but does not interfere in any way with the direct transmission of the power from the axle to the wheel and to the point thereon where traction occurs.

While I have shown the invention as applicable to an automobile wheel, it is understood that I do not wish to be limited thereto. The invention contemplates a pneumatic cushioned wheel for any vehicle or contrivance using wheels or requiring an air cushion.

Where I use the word "raceway" I mean the pair of complementary parts which receive the anti-friction elements therebetween.

I claim:

1. A cushion wheel construction for automobiles comprising a housing having a race-way, a pneumatic cushion surrounding the race-way, anti-friction means in the race-way, a main wheel member supporting the cushion, and a solid tire carried by the main wheel member, and a drive shaft extending through the housing and having a compensating connection with the wheel to accommodate the various changes in the position of the wheel relative to the axis of the housing, substantially as described.

2. A cushion wheel construction for automobiles comprising a housing having a race-way, a pneumatic cushion surrounding the race-way, anti-friction means in the race-way, a main wheel member supporting the cushion, a solid tire carried by the main wheel member, a drive shaft extending through the housing and having a compensating connection with the wheel to accommodate the various changes in the position of the wheel relative to the axis of the housing, and a circular flange on the wheel member adapted to serve as a brake drum, substantially as described.

3. A cushioned wheel construction for automobiles comprising a housing on which is mounted a raceway, a pneumatic cushion surrounding the raceway, anti-friction rollers between the cushion and the housing, a drive shaft extending through the housing, said drive shaft having an outer section connected at its ends through universal joints with the wheel and with the main part of the drive shaft, substantially as described.

In testimony whereof, I affix my signature.

NATHAN ABRAMSON.